US010354293B2

(12) United States Patent
Kaniel (10) Patent No.: US 10,354,293 B2
(45) Date of Patent: Jul. 16, 2019

(54) EVENTS TRACKING TECHNOLOGY

(71) Applicant: AppsFlyer Ltd., Tel Aviv (IL)

(72) Inventor: Oren Kaniel, Tel Aviv (IL)

(73) Assignee: APPSFLYER LTD., Tel-Aviv (IL)

( * ) Notice: Subject to any disclaimer, the term of this patent is extended or adjusted under 35 U.S.C. 154(b) by 176 days.

(21) Appl. No.: 13/649,402

(22) Filed: Oct. 11, 2012

(65) Prior Publication Data

US 2013/0097008 A1 Apr. 18, 2013

Related U.S. Application Data

(60) Provisional application No. 61/546,082, filed on Oct. 12, 2011.

(51) Int. Cl.
*G06Q 30/02* (2012.01)
*G06Q 50/00* (2012.01)

(52) U.S. Cl.
CPC ......... *G06Q 30/0277* (2013.01); *G06Q 50/01* (2013.01)

(58) Field of Classification Search
USPC ................ 705/14.41; 709/206, 224; 726/3
See application file for complete search history.

(56) References Cited

U.S. PATENT DOCUMENTS

| 2008/0288629 | A1* | 11/2008 | Fisher, III | G06Q 30/02 709/224 |
| 2010/0312966 | A1* | 12/2010 | De Atley et al. | 711/118 |
| 2011/0093920 | A1* | 4/2011 | Etchegoyen | G06F 21/121 726/3 |
| 2011/0185023 | A1* | 7/2011 | Jin | G06Q 10/06 709/206 |
| 2011/0320307 | A1* | 12/2011 | Mehta et al. | 705/26.7 |
| 2012/0035990 | A1* | 2/2012 | Lewis | G06Q 30/0207 705/14.1 |
| 2012/0144202 | A1* | 6/2012 | Counterman | G06F 21/335 713/176 |
| 2012/0224743 | A1* | 9/2012 | Rodriguez | G06T 11/60 382/103 |

(Continued)

FOREIGN PATENT DOCUMENTS

| WO | WO 2011112752 | * | 3/2011 | ............. G06Q 20/00 |
| WO | WO 2011112752 | * | 9/2011 | |

OTHER PUBLICATIONS

"Method and apparatus for mobile identity authentication". Ip.com No. IPCOM000194545D. IP.com Journal. Electronic Publication Date: Mar. 29, 2010. Authors et. al.: Disclosed Anonymously. (Year: 2010).*

(Continued)

*Primary Examiner* — Maria V Vanderhorst
(74) *Attorney, Agent, or Firm* — Oliff PLC (57) ABSTRACT

The presently disclosed subject matter includes, inter alia, a system and method of associating between a media source advertizing a given app and a respective app event of the given app. information indicative of an app event of the given app executed by a given device is received and data elements characterizing the given device and generating a fingerprint identifying the given device are obtained. The generated fingerprint is compared with at least one other previously generated fingerprint and based on the result of this comparison it is determined whether both fingerprints identify the same device.

15 Claims, 7 Drawing Sheets

(56) References Cited

U.S. PATENT DOCUMENTS

2012/0265595 A1* 10/2012 Corner .................. G06Q 30/02
705/14.23

OTHER PUBLICATIONS

"Mobile payment: A journey through existing procedures and standardization initiatives". ISSN (Electronic): 1553-877X. Publication Date: Oct. 1, 2004. Author Stamatis Karnouskos. Periodical Acronym: COMST. (Year: 2004).*

"Mobile Application Paradigms". ISBN: 9780470987735. Publisher: Wiley Telecom. Author : Paul Golding. Pages: 626. Year 2008. (Year: 2008).*

* cited by examiner

EVENTS TRACKING TECHNOLOGY

This Application claims the benefit of U.S. Provisional Application 61/546,082 filed on Oct. 12, 2012, the entirety of which is incorporated herein by reference thereto.

FIELD OF THE PRESENTLY DISCLOSED SUBJECT MATTER

This invention relates to the field of mobile applications, and more specifically to the field of event tracking and digital advertising in mobile applications.

BACKGROUND

Mobile Apps introduced for example by Apple iOS & Google Android are becoming increasing popular today. App developers distribute their app using different content distribution methods and channels. In order to increase sales it is advantageous for app developers to determine which are the distribution methods or channels delivering the best results. For example, by determining which of the distribution methods of apps provide more users, more loyal users, higher ROI (Return on Investment) and higher LTV (Life Time Value). However, such information is currently limited.

According to one typical scenario a user is exposed to an ad of a respective app at one location, clicks on the ad and is then redirected to another location where the app can be downloaded. Tracking methods used in the World Wide Web (WWW) are not applicable in the world of native apps. For example, native apps lack access to cookies and are unable to track app promotional campaigns such as advertisements (or "ad") campaigns. In addition, these apps are available for download mainly from proprietary stores, such as Apple iTunes App Store, and Google Play (formerly known as Android Market) as opposed to WWW. Therefore, tracing the location of the media source, advertizing a given mobile app, which was used by a user of the app becomes a complicated task.

App developers often relay on guesswork based on the periodic sales reports generated by the Stores which enable to download apps. For example, information indicating the number of new users joined through a campaign (a campaign representing a certain type of distribution method or channel) is obtained from calculating the number of new users the developer gained in addition to his normal daily average without running campaigns.

This approach has many limitations such as: a developer can run only a single campaign at a time, the accuracy level is low and it is difficult to imply a crediting process for crediting media sources. Thus, developers are shooting in all directions, without any concrete knowledge regarding which app distribution method provides better results in attracting new users to their mobile apps.

There is thus a need in the art for a new technology enabling to associate between a media source advertizing a given app and a respective app event performed in respect of the given app, in order to determine efficiency of different mobile apps distribution channels and/or methods.

SUMMARY

According to a first aspect of the presently disclosed subject matter there is provided a computerized method of associating between a media source advertizing a given app and a respective app event of the given app, the method comprising: With the help of a processor:
receiving information indicative of an app event of the given app executed by a given device; obtaining data elements characterizing the given device and generating a fingerprint identifying the given device; comparing between the fingerprint and at least one other fingerprint; each of the at least one other fingerprint generated in response to an indication of an interaction of a respective device with a media source advertizing the given app; determining that the fingerprint and at least one other fingerprint both identify the same device, in case similarity between the fingerprint and the at least one other fingerprint matches a predefined criterion.

According to certain embodiments of the presently disclosed subject matter, the method according further comprising: associating between the app event executed by the given device and a media source advertizing the given app which has been accessed by the given device.

According to certain embodiments of the presently disclosed subject matter, the method further comprising receiving information indicative of an interaction of a device with a media source advertizing a given app; obtaining data elements characterizing the device and generating a fingerprint identifying the device; storing the fingerprint in a data storage along with data associating the fingerprint with the given app and the media source.

According to certain embodiments of the presently disclosed subject matter, the method further comprising determining information indicating different media sources advertizing a given app and a respective number of app events of the given app associated with each media source.

According to certain embodiments of the presently disclosed subject matter, comparing as disclosed above further comprises:
in case similarity between data elements in the fingerprint and data elements in the at least one other fingerprint matches a predefined criterion, assigning at least one probability weight to a respective data elements common to the fingerprint and the at least one other fingerprint; the probability weight being a score indicative of the probability that an identical data element in the fingerprint and the at least one other fingerprint identifies the same device; calculating a uniqueness probability score, based on the at least one probability weight, for the fingerprint and the at least one other fingerprint; the probability score being indicative of the probability that the fingerprint and the at least one other fingerprint were generated to identify the same device; determining the fingerprint and the at least one other fingerprint were generated to identify the same device in case the uniqueness probability score matches a predefined criterion.

According to certain embodiments of the presently disclosed subject matter, wherein the app event is an app launching event.

According to another aspect of the presently disclosed subject matter, there is provided a computerized tracking system comprising: a computer memory associated with at least one processor operable to associate between a media source advertizing a given app and a respective app event of the given app; the processor being operable to: receive information indicative of an app event of the given app executed by a given device; obtain data elements characterizing the given device and generating a fingerprint identifying the given device; compare between the fingerprint and at least one other fingerprint; each of the at least one other fingerprint generated in response to an indication of an interaction of a respective device with a media source advertizing the given app; determine that the fingerprint and at least one other fingerprint were both generated for the same device in case similarity between the fingerprint and the at least one other fingerprint matches a predefined criterion.

According to another aspect of the presently disclosed subject matter there is provided a program storage device readable by machine, tangibly embodying a program of instructions executable by the machine to perform method steps of a method of associating between a media source advertizing a given app and a respective app event of the given app, the method comprising: receiving information indicative of an app event of the given app executed by a given device; obtaining data elements characterizing the given device and generating a fingerprint identifying the given device;

comparing between the fingerprint and at least one other fingerprint; each of the at least one other fingerprint generated in response to an indication of an interaction of a respective device with a media source advertizing the given app; determining that the fingerprint and at least one other fingerprint were both generated for the same device in case similarity between the fingerprint and the at least one other fingerprint matches a predefined criterion.

According to another aspect of the presently disclosed subject matter there is provided a device configured to communicate with the tracking system of claim 7; the device comprising a processor and a tracking module, the tracking module configured to instruct the processor to send an indication to the tracking system in case an app event of given application, being associated with the tracking module, occurred on the device; the indication including data elements characterizing different properties of the device.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "obtaining", "comparing", "determining", or the like, include action and/or processes of a computer that manipulate and/or transform data into other data, said data represented as physical quantities, e.g. such as electronic quantities, and/or said data representing the physical objects.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in FIGS. 1, 2, 4, 6 may be executed. In embodiments of the presently disclosed subject matter one or more stages illustrated in FIGS. 1, 2, 4, 6 may be executed in a different order and/or one or more groups of stages may be executed simultaneously. FIG. 7 illustrate a general schematic of the system architecture in accordance with an embodiment of the presently disclosed subject matter. Each module in FIG. 7 can be made up of any combination of software, hardware and/or firmware that performs the functions as defined and explained herein. The modules in FIG. 7 may be centralized in one location or dispersed over more than one location. In other embodiments of the presently disclosed subject matter, the system may comprise fewer, more, and/or different modules than those shown in FIG. 7.

The term "criterion" as used herein should be expansively construed to include any compound criterion, including, for example, several criteria and/or their logical combinations.

Unless defined otherwise, all technical and scientific terms used herein have the same meaning as commonly understood by one of ordinary skill in the art to which the present subject matter belongs. Generally (although not necessarily), the terms used herein described below are well known and commonly employed in the art. Conventional methods are used for these procedures, such as those provided in the art and various general references. Accordingly, the following definitions are provided for clarity of understanding only and are by no means binding.

Mobile device (or Device)—Mobile devices include devices such as traditional mobile phones, cellular devices, Smartphones and tablets or laptop computers or any other device that is able to connect to the internet through a cellular, wireless or other network as mobile connected devices.

Apps—Software applications specifically designed to operate on mobile connected devices are commonly referred to as "apps". Mobile connected devices can access information and content either through apps downloaded onto the device or from web-based mobile sites accessed using a web browser installed on the device. For convenience, unless the context otherwise requires, we refer to these apps and web-based mobile sites together as apps.

Developers—For convenience, in the description below both developers of apps and publishers of web-based mobile sites are referred to as developers.

Users—End users, mobile device users. These users are the main target market of app developers.

Loyal User—an engaged user that uses a certain app and possibly performing in-app purchases. For example: a user that downloads a hotel booking app and actually uses that app to book a hotel is a loyal user.

Download source—Any source from which an app can be downloaded. For example application stores such as Apple iTunes App Store or Google Play (referred herein in general as "stores").

Media Sources—Sources that are used for distributing apps. For example: Ad-networks, social networks and other discovery platforms as described in FIG. 3.

App download/installation—Refers to the user action of downloading and installing a mobile app. In most cases the act of downloading & installing an app is combined and will be simply referred as Install. App install can be either free or paid.

SDK (Software Development Kit)—a Platform used by the developer while developing his app.

Tracking SDK—A Library (compiled software code) integrated by app developers in their apps to allow tracking.

Device Fingerprint—a collection of data elements extracted from a mobile device used to identify the device. Data elements can includes, by way of non-limiting example: device model, OS (operating system) version, Language setup, various device settings, screen size, device name, unique ID (UDID), MAC address, IMEI (International Mobile Equipment Identity), IP address, regional settings, location, WiFi, 3G, carrier, device brand and others. The combination of a number of such elements is used to create an identity of a respective device/user. The identity may not be unique.

App Link—A link used to download an application from the store. For example: http://itunes.apple.com/us/app/angry-birds/id343200656s for Angry Birds game app on the Apple App Store.

Native App—A mobile app that is based on the device/OS manufacturer SDK. Usually uses the native code and being distributed by the platforms' Stores such as Apple App Store & Google Play.

Web Apps—Apps based on web browser. Usually uses html & JavaScript. Can be accessed by simply browsing to the web-app url.

App Event—app events include different events (operations) which are performed on a device in respect of a given app. App events include for example, downloading event of an app, installation of an app, an launching (executing) an app.

Conversion—app event that defines a user conversional point, such as a visitor becoming a user or client. For example: user clicks a banner ad, installs an application and becomes a user. Users can also perform conversions inside the application, for example free user performs a purchase and becomes a paying user.

The presently disclosed subject matter includes, inter alia, a system and method enabling app event tracking These events include any interaction with a media source of an app (e.g. an App link or ad) as well as downloading, installation and launching the app. Interaction with a media source results in redirection of the user to a download source and can eventually result in the downloading and launching of the app on the user's device. Event tracking enables to associate between a media source advertizing a given app and a respective app event (e.g. app launching event) of the given app. Once this association is made app developers can determine which of the media sources they use delivers users to install their apps. App developers can further use this information to measure the users loyalty, measure promotional campaigns ROI, measure users LTV (Life Time Value) and compare between the different marketing channels.

Figure 1:
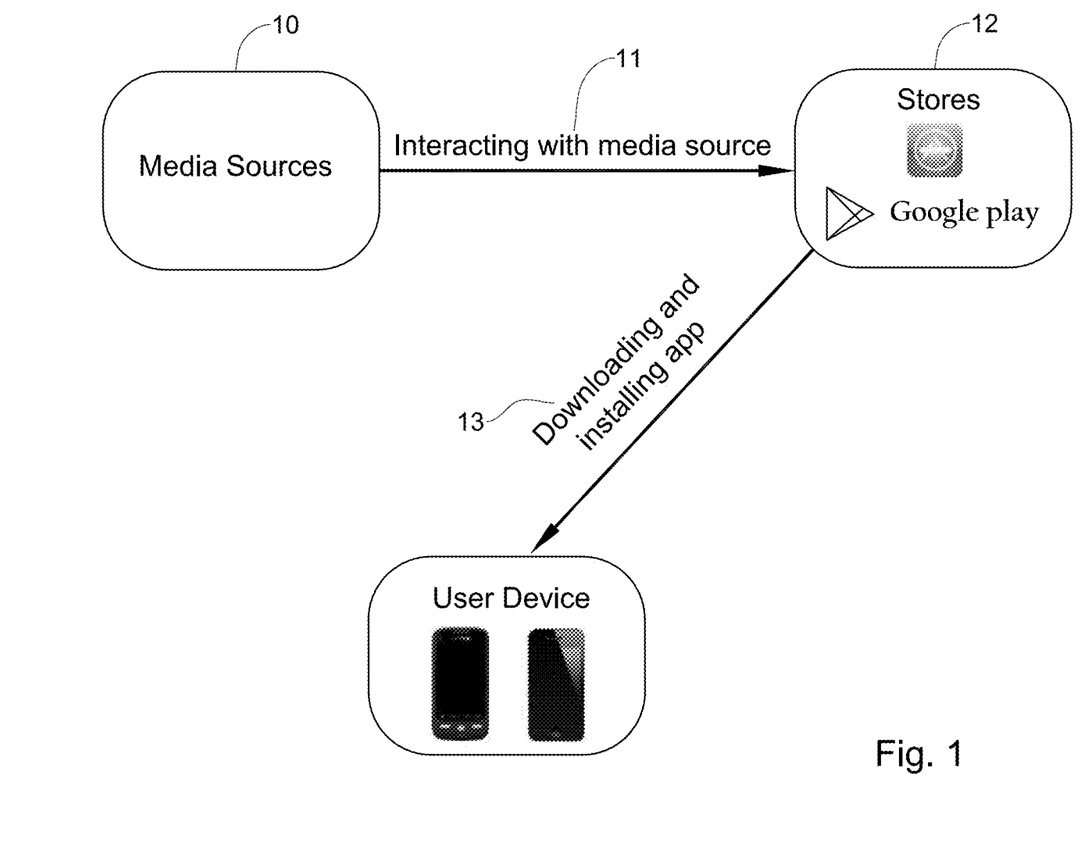
FIG. 1 is a flowchart illustrating operations performed during mobile apps download and installation process without tracking as known in the art.

FIG. 1 is a flowchart illustrating operations performed during mobile apps download and installation process without tracking as known in the art. According a typical scenario, an end user is exposed to a media source 10 (exemplified below with reference to FIG. 3) clicks an app promotional ad 11 (App Link) and is redirected to a download source 12 (e.g. App Store or Google Play). When a user downloads and installs the application 13, the app developer does not have any record or knowledge of how the user actually discovered the app (e.g. with what type of media source or distribution method the user interacted in order to access the application) and what exactly drove the specific user to install the app. In addition, not only that the app developer does not know which media source was used, he also cannot deduce any additional information such as for example, which media source exposed most loyal users to a given app, nor can he determine ROI per a given promotional campaign, as well as other important information.

Figure 2:
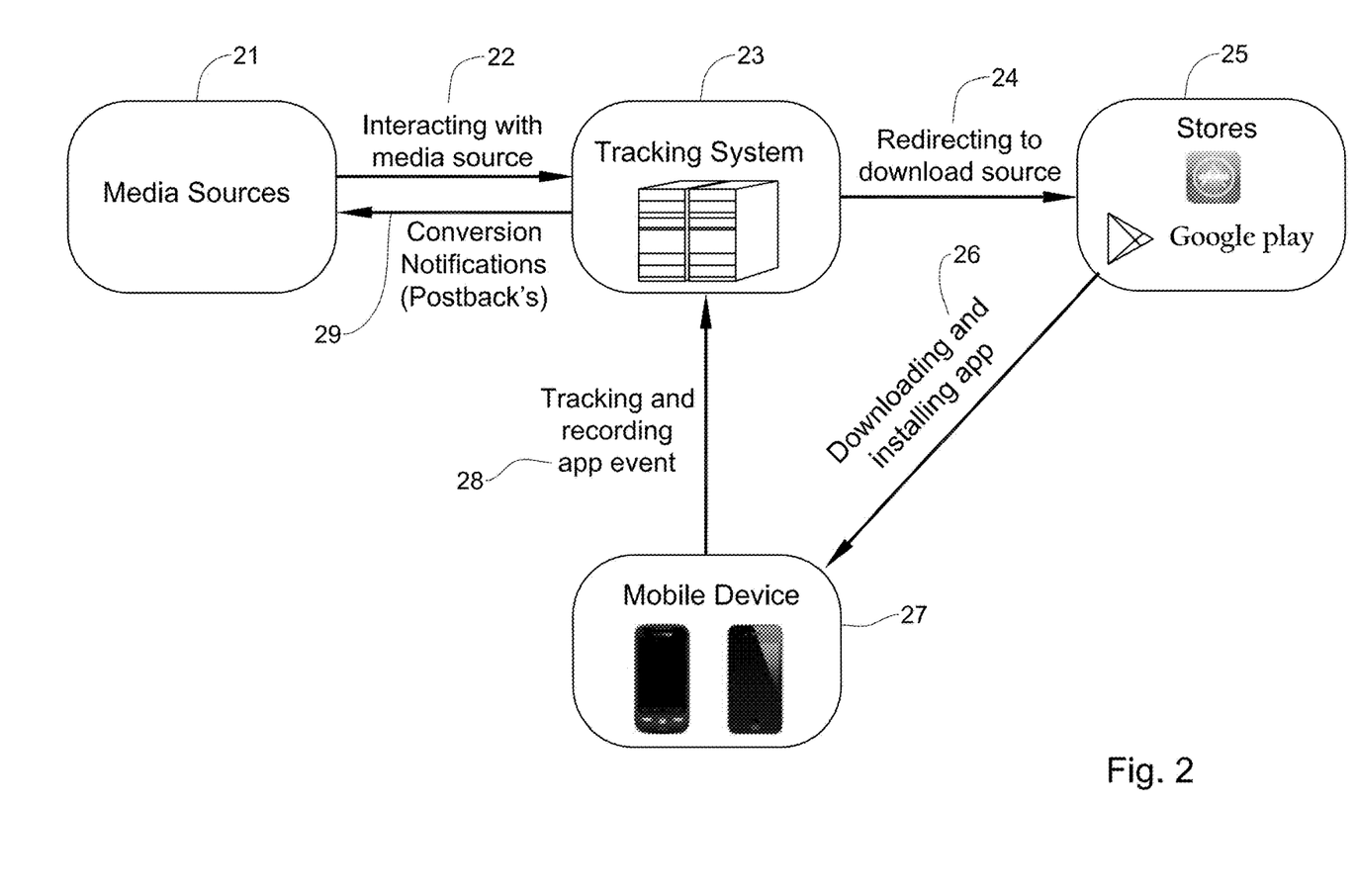
FIG. 2 is a flowchart illustrating operations performed during mobile apps download and installation process with event tracking, in accordance with the presently disclosed subject matter.

FIG. 2 is a flowchart illustrating operations performed during mobile apps download and installation process with event tracking, in accordance with the presently disclosed subject matter. Unlike the process described earlier with reference to FIG. 1 here information in respect of interacting devices is being collected and utilized for determining the media source which was used by a user.

Instead of simply redirecting to the download source 25, in response to a user interaction with a media source, tracking system 23 is configured to process the interaction request 22. The processing includes extracting various data elements from the user device before redirecting the user to the download source 24, 25 and generating based on the data elements a fingerprint identifying the device. Once the user downloads and installs 26 (and launches the newly installed app) 27, tracking system 23 is configured to identify an app event (e.g. app launching event) 28, obtain data elements characterizing the device and generate a second fingerprint. Tracking system 23 is then enabled, by executing a fingerprint matching process, to determine which media source was used to expose the device to now launched app. A more detailed description of the tracking and fingerprint matching processes is described below with reference to FIGS. 5 and 6.

Once a media source is associated with a respective app event (conversion) tracking system 23 is configured to make this information available to the app developer and/or the media source 29. The developer (and/or publisher) of the app can then use this information for optimizing the distribution method of the relevant app. Furthermore, this information can be used for billing purposes, for example an ad-network can charge for a successful installation of a given app instead of a charging for any click on a respective ad.

Figure 3:
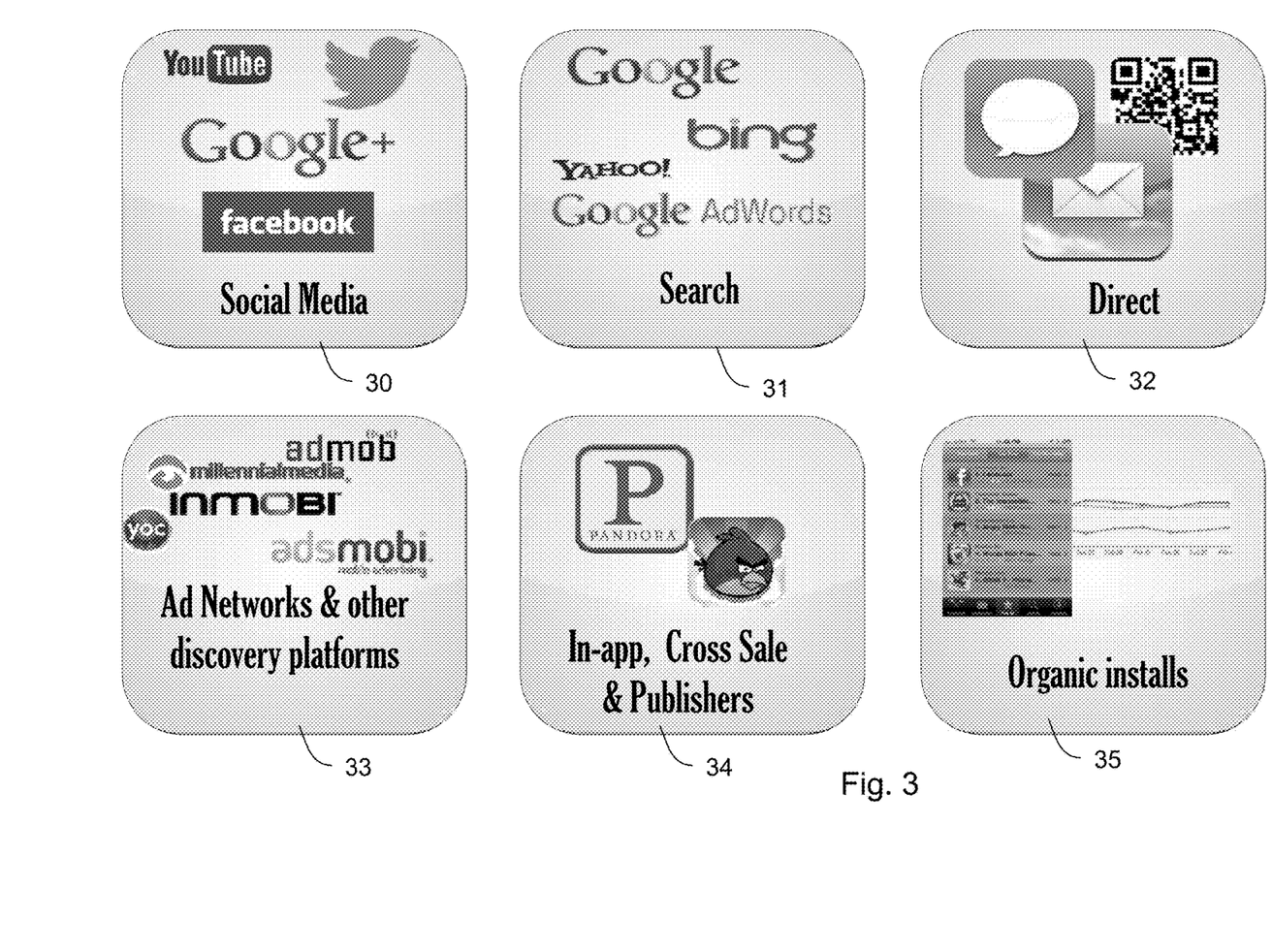
FIG. 3 is an illustration showing examples of different media sources used for exposing users to mobile apps, in accordance with the presently disclosed subject matter.

FIG. 3 is an illustration showing examples of different media sources used for exposing users to mobile apps, in accordance with the presently disclosed subject matter. It should be noted that the examples provided by FIG. 3 are non-limiting 30—Social Media—Media sources such as Facebook, twitter and others.

31—Search—Media sources including search engines such as Google, Bing, organic and paid (e.g. AdWords)

32—Direct—Direct media sources such as email, text messaging (SMS), QR codes etc.

33—Ad-networks—ad-networks aggregates multiple media source into one source. It also includes media buying agencies and mobile app discovery platforms.

34—In-app, cross sale & publishers—direct media exchange between developers.

35—Organic installs—users discover the app based on viral, news, friends recommendations, Store exposure etc.

Figure 4:
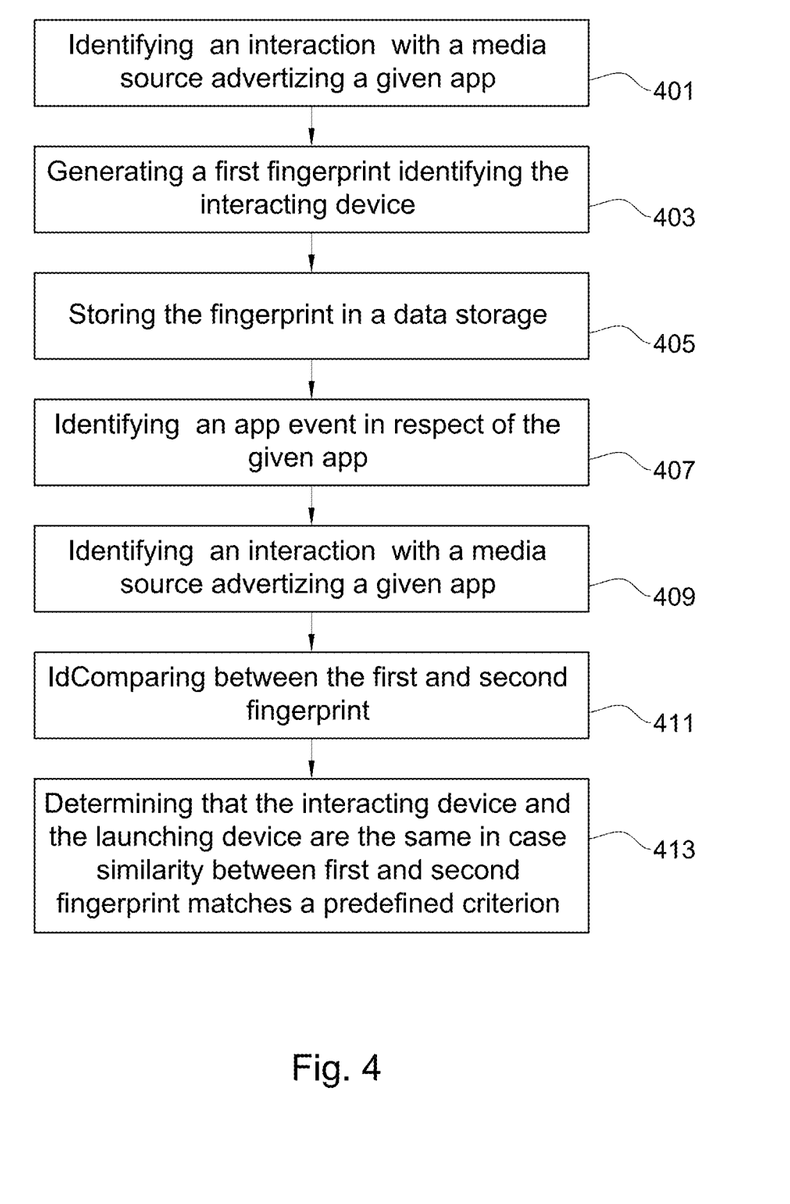
FIG. 4 is a flowchart showing operations performed during a tracking process, in accordance with the presently disclosed subject matter.

FIG. 4 is a flowchart showing operations performed during a tracking process, in accordance with the presently disclosed subject matter. Operations described with reference to FIG. 4 can be executed by tracking system 23 (which is described below with reference to FIG. 7).

At block 401 an interaction of a device with a media source associated with a given app is identified. Such interactions include for example clicking an ad or a link advertising a given app. Tracking system 23 is configured to receive information indicative of interactions with a media source. This can be accomplished for example, with the help of a tracking agent which is associated with the media source and sends a message to tracking system 23 when an interaction with the media source occurs. The message includes data elements characterizing the interacting device which enable to generate a respective device fingerprint.

In response to receiving information indicative of an interaction with the media source, tracking system 23 is configured to generate a first fingerprint identifying the interacting device (block 403) and to store the fingerprint, in a data repository associated with tracking system 23 (block 405).

Assuming the user downloads and installs the app, app event is identified by tracking system 23. For example upon the first launch of the app the app launching event of the given app can be identified by tracking system 23 (block 407). As explained above app events include different events (operation) which are performed on a device in respect of a given app. App events include for example, downloading event of an app, installation of an app, an launching (executing) an app. It should be noted that reference made in the description below to "app launching event" is by way of non-limiting example only and should not be construed as limiting to launching events alone.

Tracking system 23 is configured to identify a app launching event of a given app, for example, with the help of a tracking module (e.g. SDK) integrated into a tracking application which sends a message to tracking system 23 when a app launching event occurs at the device (referred herein as "launching device"). The message includes data elements characterizing the launching device which enable to generate a respective device fingerprint (similar to the data elements received in response to an interaction with a media source as described above). A second fingerprint is then generated, by tracking system 23, identifying the device which generated the app launching event (block 409).

The first fingerprint (which was previously stored in a related data-repository) and the second fingerprints can then be compared (block 411). In case similarity between the first and second fingerprints is determined to match a predefined criterion the interacting device and launching device are determined as the same device (block 413). Comparison between the first and second fingerprints is performed with the help of fingerprint matching process which is described in more detail below with reference to FIG. 6.

The tracking process disclosed herein, enables to associate between a media source advertizing a given app (and enabling the download of the app) and a respective app launching event of the given app. This association enables the developer to derive information which is useful for improving business performance. An app developer can determine for example, which media source exposed most users (or loyal users) to a given app. As explained above additional information can be deduced including: revenue per media source, ROI (Return On Investment) & LTV (Life Time Value) per media source or any other parameter.

As the user uses the app additional in-app events (type of app events occurring during actual usage of an app) are being generated and recorded by tracking system 23. For example an in-app booking event can be generated in response to a user calling a taxi ride using a relevant application. In-app events are sent along with the data elements of the device current fingerprint along with a consistent custom unique ID generated upon the very first app launch. This custom ID allows the tracking algorithm to keep track of any changes in the device fingerprint. For example: in case a user is updating the device OS version and launches the app again, the device fingerprint is updated accordingly in tracking system 23. This can be enabled with the help of a tracking module (e.g. SDK) integrated into the app which sends a message to tracking system when a data elements constituting the device fingerprints are modified. Tracking the device fingerprints changes allows the tracking platform to update the respective device fingerprints uniqueness score described below. In addition, it allows tracking more accurately, future interactions with App Link made with the same device.

Figure 5:
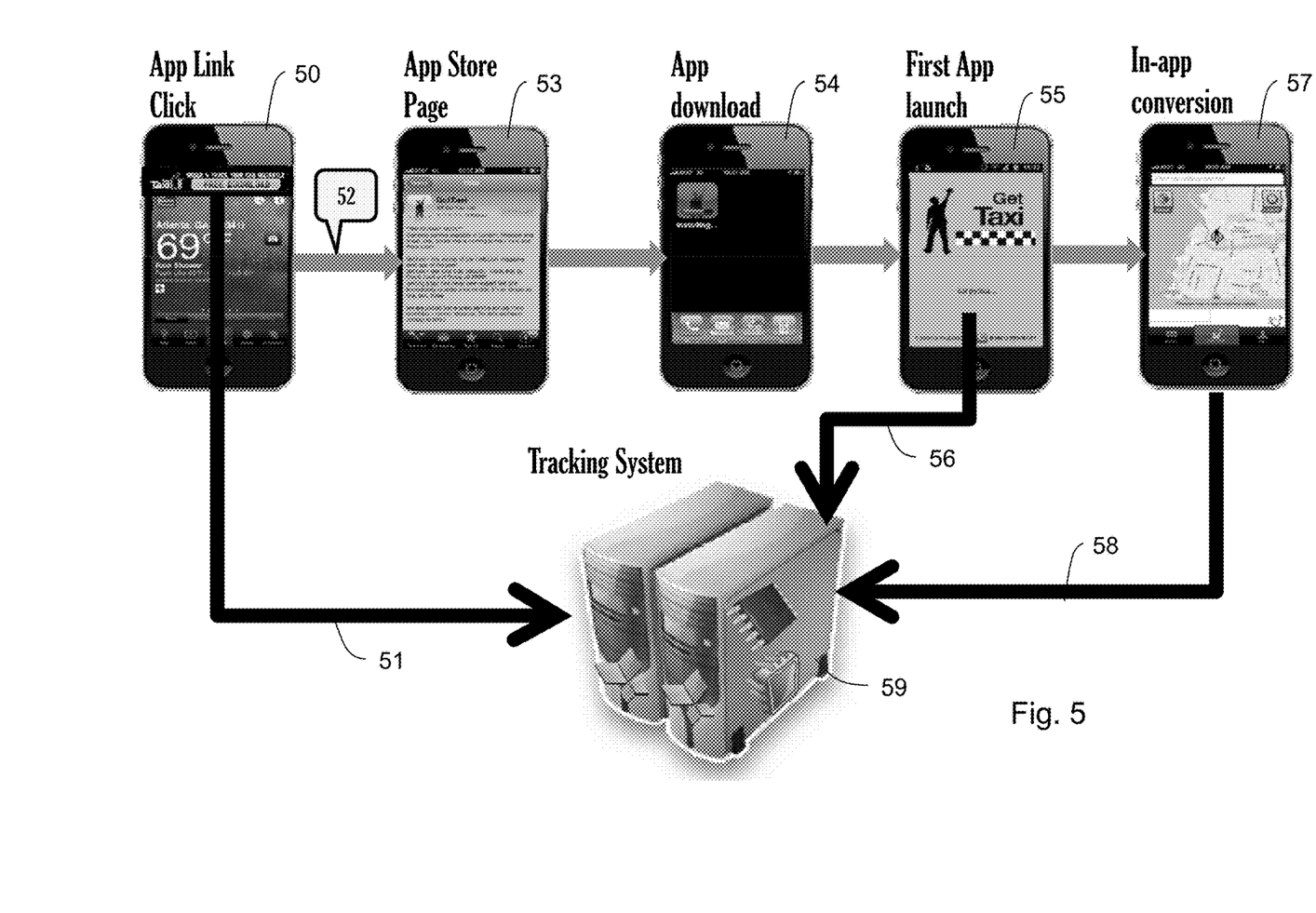
FIG. 5 is a schematic illustration illustrating an example of a tacking process, in accordance with the presently disclosed subject matter.

FIG. 5 is a schematic illustration showing an example of a tracking process, in accordance with the presently disclosed subject matter. A user is exposed to an ad suggesting to download a mobile application 50. The user decides that he want to check whether the application is worth downloading and clicks the banner of the ad 50. A message notifying that the banner has been clicked is sent to tracking system 23 along with data elements characterizing the device. Tracking system 23 generates a first fingerprint identifying the device the device based on the data elements. The device is then redirected 51 to the Store 52 to complete the app download and install process. The user then decides to download the app and the install process begins 54. Once completed, the user launches the app for the first time 55. Upon the first launch an app launching event notification is sent to tracking system 56. The event includes information (i.e. data elements) indicative of the device properties and a second fingerprint is generated. The fingerprints are then compared, with the help of the fingerprint matching process, and it is determined whether the two fingerprints represent the same device.

Once the app install is tracked, tracking system 23 can keep track of the user for further post-install events or in-app conversion events 57. For example: taxi booking.

Figure 6:
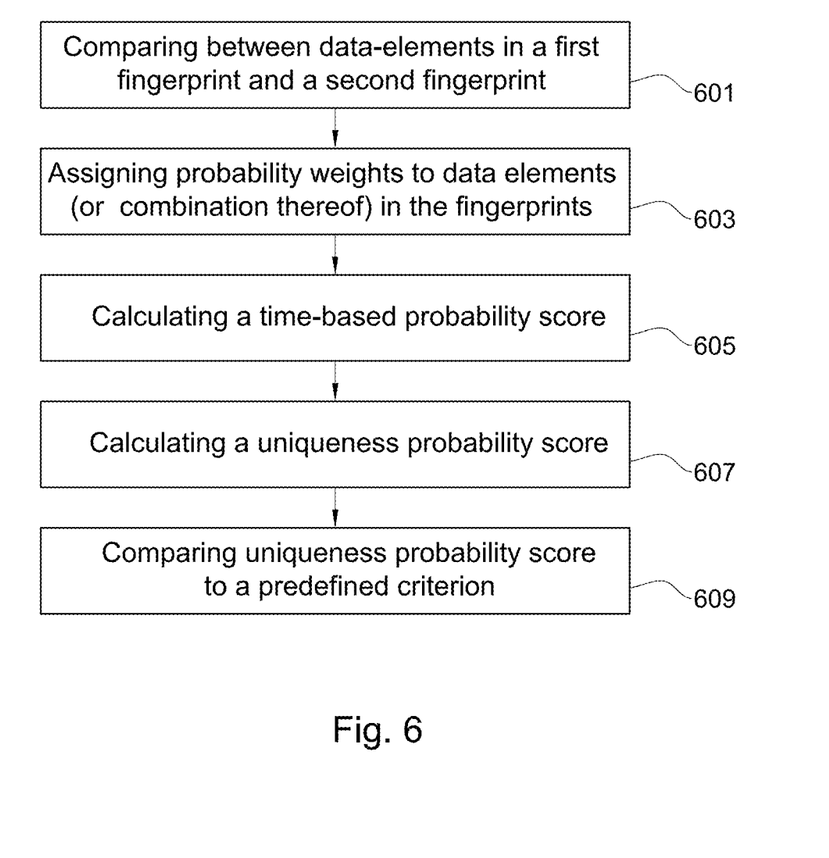
FIG. 6 is a flowchart illustrating operation performed during fingerprints matching process, in accordance with the presently disclosed subject matter.
Figure 7:
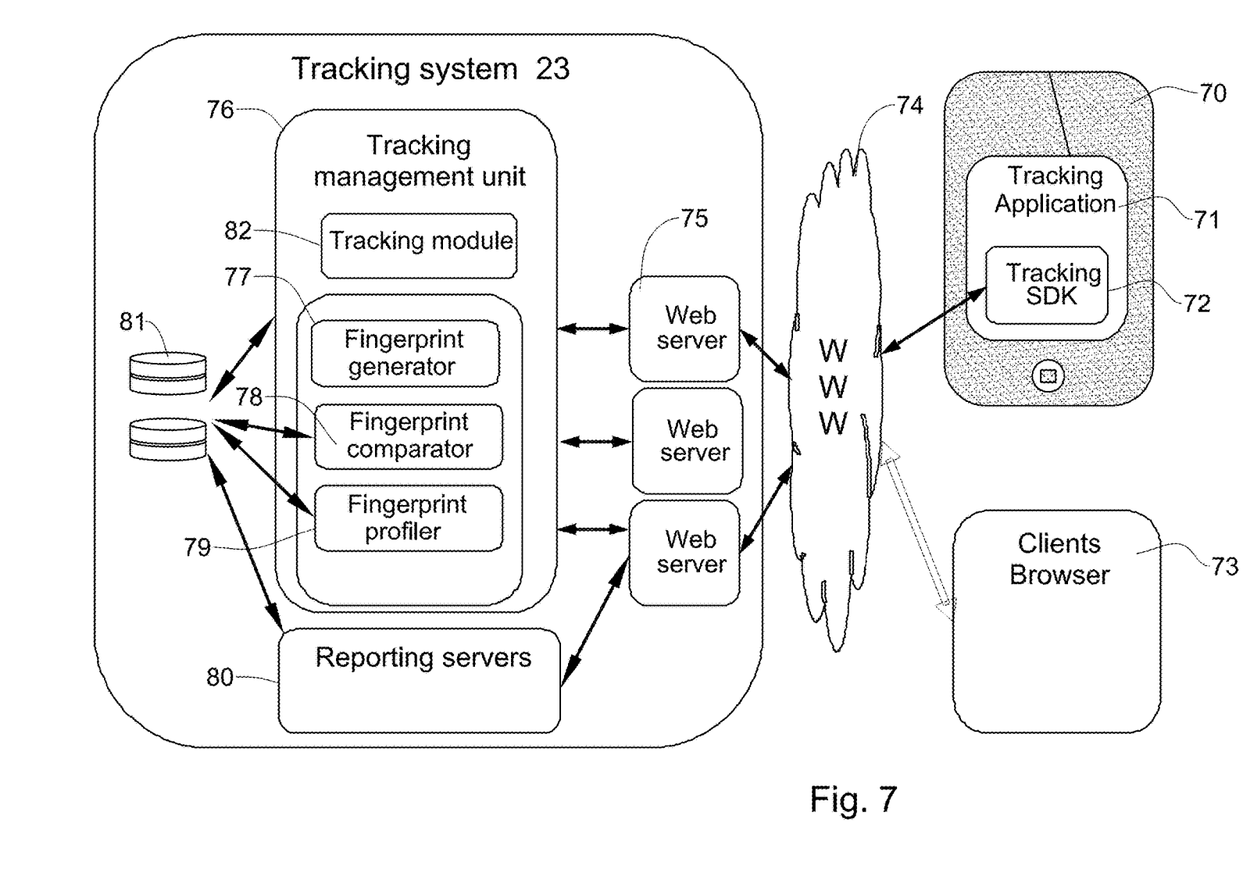
FIG. 7 is a functional block diagram schematically illustrating a tracking system, in accordance with the presently disclosed subject matter.

FIG. 6 is a flowchart showing operations performed during fingerprint matching process, in accordance with the presently disclosed subject matter. Operations described with reference to FIG. 6 can be executed by tracking system 23 illustrated below with reference to FIG. 7.

Operations described with reference to FIG. 6 provide a more detailed description of the comparison described above with reference to block 411 in FIG. 4. Matching process is directed to determine the probability two fingerprints (e.g. one generated for an interacting device and another generated for a launching device) were generated for the same device. Once a (second) fingerprint is generated for a launching device (referred herein as "launching fingerprint"), the fingerprint is compared with one or more fingerprints stored in a data-repository associated with tracking system 23 which were generated in response to an interaction with a media source advertizing the same given app (referred herein as "media source fingerprints").

The comparison between the launching fingerprint and the stored media source fingerprints enables to determine which pair of fingerprints are characterized by the greatest similarity and thereby associate between a respective launching event and a receptive media source. Thus, it can determined which of the media sources caused the app launch event.

As explained above each fingerprint comprises a collection of elements which characterize the respective device. The comparison between fingerprints includes a naïve comparison between the collection of elements comprised in the launching-fingerprint and the collection of elements in at least one other media source fingerprint previously generated for one or more respective interacting devices (block 601).

In some cases, the naïve comparison between elements may be sufficient for determining that two fingerprints were generated for the same device. For example, in case a fingerprint includes a device id which uniquely identifies the device (e.g. UDID or IMEI). However, in other cases, where the fingerprint does not include a unique identifying data element, the naïve comparison is not sufficient. In such cases the naïve comparison may result with the identification of multiple fingerprints comprising identical (or similar, where similarity is determined based on some predefined criterion) data elements. Further processing is therefore required in order to determine which fingerprints are likely to be associated with the same device.

In order to determine whether different fingerprints comprising identical (or similar) data elements were actually generated for the same devices, probability-based matching is performed. Selected data elements (or a specific combination of elements) in the fingerprint are assigned with a probability weight (block 603). The probability weight is indicative of the estimated probability that two fingerprints which comprise an identical data element (or a specific combination of identical data elements), are both associated with the same device.

For example, the device settings (including for example the language setup and/or the name of the device) can be assigned with a probability weight indicating the probability two fingerprints with identical setting were generated for the same device.

In another example, assuming one data element in the fingerprint is the device model, a device model which is currently very rare in the market (e.g. a new device model which has not yet been released or an old device model which is rarely used) can be assigned with a high probability weight, indicating that two fingerprints which comprise that same rare device model are likely to be generated from the same device. Other device models which are more common are assigned with a lower probability weight. Note, that in this example the probability weight is dependent on the actual value of the data element i.e. the actual model of the device.

A uniqueness probability score is calculated based on the probability weight which is assigned to specific elements in two compared fingerprints (block 607).

Optionally, a time-based probability score can also be used (block 605). The time elapsed between the time of interaction with the media source (and the respective generation time of the first fingerprint) and the time of the launching of the application (the respective time of generation of the second fingerprint) is considered as well. At the time two fingerprints are compared the time elapsed between the generation of the first and second fingerprint is considered and a respective score is provided. A short period of time between the generation of the first and second fingerprint is a stronger indication that the two fingerprints were generated for the same device than a longer period of time. Accordingly, the shorter the time between the generations of the two fingerprints the higher is the time-based probability (score) which is given. For example, the time-based probability score can linearly fade over time. The time-based probability score can be considered as part of the calculation of the uniqueness probability score.

The uniqueness probability score which is indicative of the probability that two compared fingerprints represent the same device can be compared to a predefined criterion (e.g. a predefined threshold) (block 609). In case the uniqueness probability score complies with the criterion it is determined that the two fingerprints represent the same device.

FIG. 7 is a block diagram schematically illustrating an example of system architecture of tracking system, in accordance with the presently disclosed subject matter. Tracking system 23 can be configured as a distributed system over a plurality of computerized devices located at various geographical locations or as a consolidated computerized device.

Tracking system 23 comprises or is otherwise associated with a data-repository 81 (e.g. including a non-transitory computer memory such as a hard disk or flash memory). Tracking system further comprises a tracking management unit 76 which further comprises tracking module 82, fingerprint generator 77, fingerprint comparator 78 and fingerprint profiler 79.

Tracking module 82 is configured to identify an interaction of a device with a media source and receive information indicative of a device fingerprints as described above with reference to block 401 in FIG. 4. The information received by tracking module 81 is used by fingerprint generator 83 for generating a fingerprint as described above with reference to block 403 in FIG. 4. Information in respect of the fingerprint and the associated device are stored in data-repository 81.

As seen in FIG. 7 device 70 comprise a mobile app 71 for example: Angry Birds app. The tracking SDK 72 is an integral part of the mobile app 71. The tracking SDK is configured to send tracking system 23 information indicating different app events occurring in respect of the application (e.g. that the mobile app has been launched) along with information in respect of fingerprints identifying device 70. It should be noted that for simplicity FIG. 7 shows a single device, however this is by way of example only and a plurality of devices can be simultaneously connected to tracking system 23.

Tracking module 82 (or optionally another tracking module specifically designated for this purpose) is configured to receive the information regarding the app launching event sent from device 70 and fingerprint generator 83 is configured to generate a second fingerprint identifying device 70, based on the received information, as described above with reference to blocks 407 and 409 in FIG. 4.

Communication between device 70 and tracking system 23 can be based on any type of suitable communication infrastructure and protocol (e.g. cellular and/or WiFi). Tracking system 23 may further comprise or be otherwise associated with one or more web servers facilitating communication with device 70 (e.g. over the Internet 74) and can also be configured to filter incoming information from device and forward to tracking system 23 only the relevant information.

Fingerprint comparator 78 is configured to compare between a fingerprint generated in response to an app event (e.g. an app launching event) and one or more other fingerprints generated in response to an interaction with a media source advertizing the same app, which are stored in data-repository 81. As explained above, in case similarity between fingerprints matches a predefined criterion it is determined that the same device which initiated the app event (associated with one fingerprint) is the same device that interacted with a given media source (associated with another fingerprint). Fingerprint comparator 78 can comprise or be otherwise associated with a fingerprint profiler module 79 configured to calculate a uniqueness probability score as described above with reference to FIG. 6. The uniqueness probability score is used for determining a probability the two fingerprints were generated for the same device.

Historical information in respect of devices that have been analyzed by tracking system 23 as well as information associating between different media sources advertizing a given app and respective app events (e.g. successful launching event) can be stored in data repository 81.

Tracking system 23 can further comprise or be otherwise associated with one or more reporting servers 80 configured to provide information associating between different media sources and respective successful launches. For example, an application developer which advertizes an app by a number of different distribution methods through different respective media sources can access reporting server 80 (e.g. with the help of an Internet browser) and obtain statistical information indicating which of the media source generated the greatest number of successful launches of the advertized app.

Tracking system 23 comprises or is otherwise associated with at least one processor operable for executing related operations as described herein. The term "processor" should be expansively construed to cover any kind of electronic device with data processing capabilities, including, by way of non-limiting example, a personal computer, a server computer, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The term "computer" as used herein should be expansively construed to cover any kind of electronic device with data processing capabilities. The operations in accordance with the teachings herein may be performed by a computer specially constructed for the desired purposes or by a general purpose computer specially configured for the desired purpose by a computer program stored in a computer readable storage medium.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory (including, but not limited to, non-transitory computer memory such as hard disk drive, CD-ROM, DVD, flash memory and the like) tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computerized system for tracking a device interacting with a media source, the system comprising:
a memory;
a network communication interface; and
at least one processor configured to:
  perform event tracking of a user click or other redirection interaction on a mobile device with the media source, exposing a specific mobile app, the performing of the event tracking including:
    receiving a first message indicative of clicking, or otherwise interacting with, the media source in a manner that would redirect the interacting mobile device to a mobile app download source of the specific mobile app that is a different entity than the media source; and
    in response to receiving the first message:
      extracting first data elements characterizing the interacting mobile device from the first message;
      after extracting the first data elements, redirecting the interacting mobile device to the mobile app download source;
      generating, based on the extracted first data elements, a first mobile device fingerprint identifying the interacting mobile device, which is a first mobile device; and
      storing, in the memory, the generated first mobile device fingerprint in association with information regarding the specific mobile app and information regarding the media source exposing the specific mobile app;
  perform event tracking of app events, including at least one of app download, install and launch events of the specific mobile app, the performing of the event tracking of the app events including:
    receiving a second message, the second message being indicative that the app event has occurred and comprising extracted second data elements characterizing the downloading, installing or launching mobile device, which is a second mobile device;
    generating, based on the extracted second data elements, a second mobile device fingerprint identifying the second mobile device;

determining whether the second mobile device fingerprint matches a mobile device fingerprint previously-stored in the memory; and
in the event that the second mobile device fingerprint matches a mobile device fingerprint previously-stored in the memory: determining that the media source associated with the matching previously-stored mobile device fingerprint is the media source exposing the same mobile device to the specific mobile app; and
provide a report associating different media sources with respective app events, wherein the report is indicative of at least an association of the media source interacted with on the same mobile device with the specific mobile app.

2. The tracking system of claim 1, wherein the media source for distributing the specific mobile app is one of: a social media source, a search engine, an email, a text message, a QR code, an ad-network, and an in-app media source.

3. The tracking system of claim 1, wherein the media source for distributing the specific mobile app is an organic install media source.

4. The tracking system of claim 1, wherein the at least one processor is further configured to perform the event tracking of the app events for taxi booking app events, and generate reports indicating the media source resulting in specific taxi booking app events.

5. The system of claim 1, wherein the at least one processor is further configured to: determine an association between an app launch event executed by the first mobile device and the media source exposing the specific mobile app.

6. The system of claim 1, wherein the click or other redirection interaction is performed via a link in the media source.

7. The system of claim 1, wherein the at least one processor is further configured to: determine information indicating different media sources distributing the specific mobile app and a respective number of app events of the given app associated with each media source.

8. The system of claim 1, wherein the determining comprises: in a case a similarity between the extracted first and second data elements match a predefined criterion:
assigning at least one probability weight to one of the respective data elements common to each of the first and second device fingerprints, the at least one probability weight being a score indicative of the probability that an identical data element in the first device fingerprint and the second device fingerprint identifies the same mobile device;
calculating a uniqueness probability score, based on the at least one probability weight, for the first and second mobile device fingerprints, the probability score being indicative of the probability that the first and second mobile device fingerprints were generated to identify the same device; and
determining the first and second mobile device fingerprints were generated to identify the same device in a case the uniqueness probability score matches another predefined criterion.

9. The system of claim 8, wherein the at least one probability weight includes a time-based probability weight.

10. The system of claim 1, wherein the at least one of download, install or launch app event is an app launch event.

11. The mobile device configured to communicate with the tracking system of claim 1, wherein the mobile device comprises a processor and a tracking module, the tracking module configured to instruct the processor to send the second message to the tracking system in a case that an app event of the specific mobile app occurs, the second message including the extracted second data elements.

12. The tracking system of claim 1, wherein the mobile device is a cellular device.

13. A computerized method for tracking a device interacting with a media source, the method comprising:
performing, by a hardware server comprising at least one processor and at least one memory, event tracking of a user click or other redirection interaction on a mobile device with the media source, the media source exposing a specific mobile app, the performing of the event tracking including:
receiving a first message indicative of clicking, or otherwise interacting with, the media source in a manner that would redirect the interacting mobile device to a mobile app download source of the specific mobile app that is a different entity than the media source; and
in response to receiving the first message:
extracting first data elements characterizing the interacting mobile device from the first message;
after extracting the first data elements, redirecting the interacting mobile device to the mobile app download source;
generating, based on the extracted first data elements, a first mobile device fingerprint identifying the interacting mobile device, which is a first mobile device; and
storing, in the at least one memory, the generated first mobile device fingerprint in association with information regarding the specific mobile app and information regarding the media source exposing the specific mobile app;
performing, by the hardware server, event tracking of app events including at least one of app download, install and launch events of the specific mobile app including:
receiving a second message, the second message being indicative that the app event has occurred and comprising extracted second data elements characterizing the downloading, installing or launching mobile device, which is a second mobile device;
generating, based on the extracted second data elements, a second mobile device fingerprint identifying the second mobile device;
determining whether the second mobile device fingerprint matches a mobile device fingerprint previously-stored in the memory; and
in the event that the second mobile device fingerprint matches a mobile device fingerprint previously-stored in the memory, the match indicating that the first mobile device and the second mobile device are the same mobile device: determining that the media source associated with the matching previously-stored mobile device fingerprint is the media source exposing the same mobile device to the specific mobile app; and
providing, by the hardware server, a report associating different media sources with respective app events, wherein the report is indicative of at least an association of the media source interacted with on the same mobile device with the specific mobile app.

14. A non-transitory computer readable medium comprising computer executable instructions that, when executed by a networked computer, cause the networked computer to:

perform event tracking of a mobile device, wherein a user clicks or performs another redirection interaction on the mobile device with a media source, the media source exposing a specific mobile app, the performing of the event tracking comprising:
    receiving a first message indicative of clicking, or otherwise interacting with, the media source in a manner that would redirect the interacting mobile device to a mobile app download source of the specific mobile app that is a different entity than the media source;
    in response to receiving the first message:
        extracting first data elements characterizing the interacting mobile device from the first message;
        after extracting the first data elements, redirecting the interacting mobile device to the mobile app download source;
        generating, based on the extracted first data elements, a first mobile device fingerprint identifying the interacting mobile device, which is a first mobile device; and
        storing, in a memory, the generated first mobile device fingerprint in association with information regarding the specific mobile app and information regarding the media source exposing the specific mobile app;
perform event tracking of app events including at least one of app download, install and launch events of the specific mobile app, the performing of the event tracking of the app events including:
    receiving a second message, the second message being indicative that the app event has occurred, and comprising extracted second data elements characterizing the downloading, installing or launching mobile device, which is a second mobile device;
    generating, based on the extracted second data elements, a second mobile device fingerprint identifying the second mobile device;
    determining whether the second mobile device fingerprint matches a mobile device fingerprint previously-stored in the memory; and
    in the event that the second mobile device fingerprint matches a mobile device fingerprint previously-stored in the memory, the match indicating that the first mobile device and the second mobile device are the same mobile device: determining that the media source associated with the matching previously-stored mobile device fingerprint is the media source exposing the same mobile device to the specific mobile app; and
provide a report associating different media sources with respective successful downloads, installs or launches, wherein the report is indicative of at least an association of the media source interacted with on the same mobile device with the specific mobile app.

15. The mobile device according to claim 11, wherein the mobile device is a cellular device.

* * * * *